Oct. 27, 1964 D. J. CRIMMINS 3,154,365

HOLDER FOR CONDUCTOR TAPE

Filed July 16, 1962 3 Sheets-Sheet 1

INVENTOR
D. J. CRIMMINS
BY [signature]
ATTORNEY

Oct. 27, 1964 D. J. CRIMMINS 3,154,365

HOLDER FOR CONDUCTOR TAPE

Filed July 16, 1962 3 Sheets-Sheet 2

INVENTOR

D. J. CRIMMINS

BY Harry [signature]

ATTORNEY

HOLDER FOR CONDUCTOR TAPE

Filed July 16, 1962 3 Sheets-Sheet 3

INVENTOR
D. J. CRIMMINS
BY [signature]
ATTORNEY

United States Patent Office 3,154,365

Patented Oct. 27, 1964

3,154,365

HOLDER FOR CONDUCTOR TAPE

David J. Crimmins, Nutley, N.J., assignor, by mesne assignments, to The Kent Manufacturing Co., Elizabeth, N.J., a corporation of New Jersey Filed July 16, 1962, Ser. No. 209,903
7 Claims. (Cl. 339—176)

Figure 1:
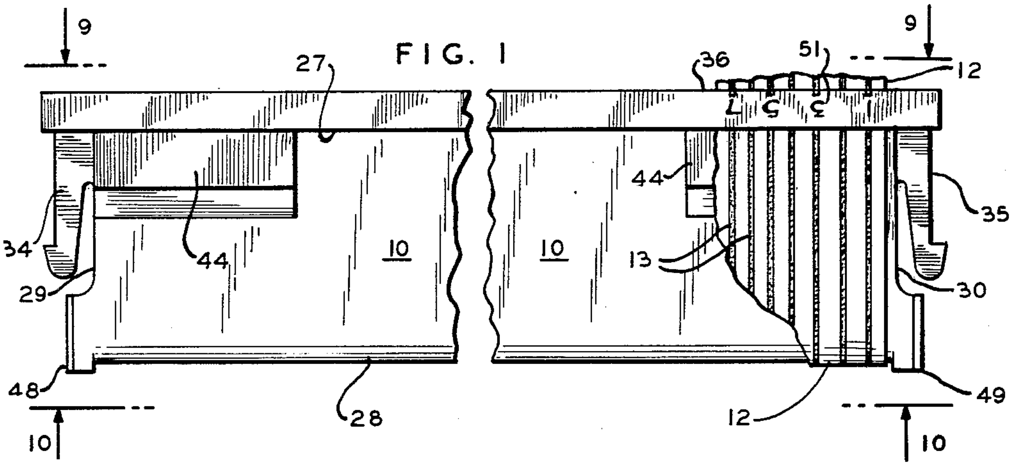

This invention relates to a holder for connecting conductors contained in flexible dielectric strips or tapes, to other conductors. The invention further provides automatic keying and registering indicating means for registration, location and identification of particular conductors and to assure correct assembly of the parts.

The invention further provides a convenient, accurate, reliable and efficient holder for connection and registration of a conductor tape therein, having a part on which the tape may readily be positioned in accurate registry and planar position for interengagement with a tape-engaging part or member, to complete circuits through preselected conductors.

The drawings, illustrating procedures and devices useful in carrying out the invention, and the description below, are exemplary only of the invention, which shall be deemed to cover all other devices and procedures coming within the scope and purview of the appended claims.

Figure 2:
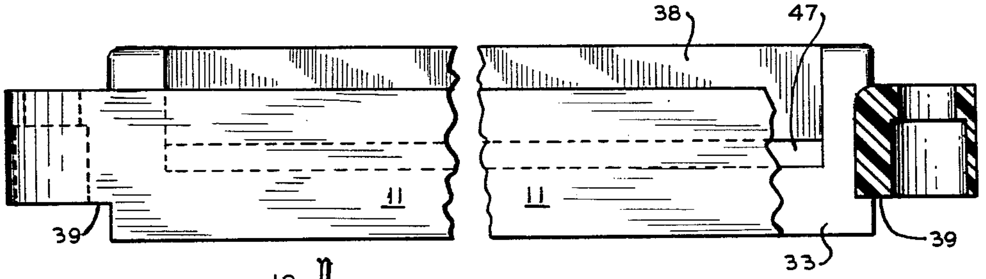
Figure 3:
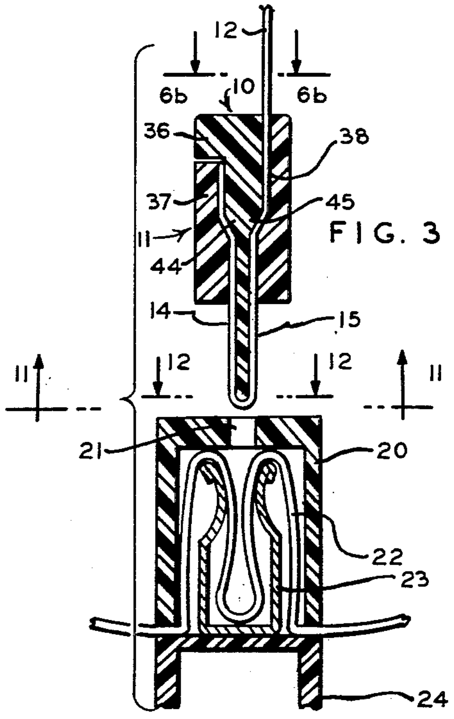
Figure 4:
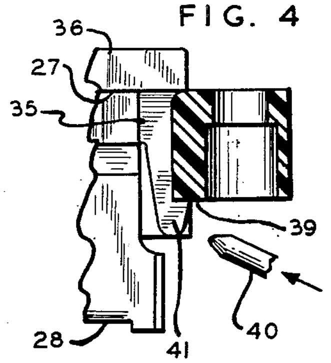
Figures 5, 6, 6A, 6B:
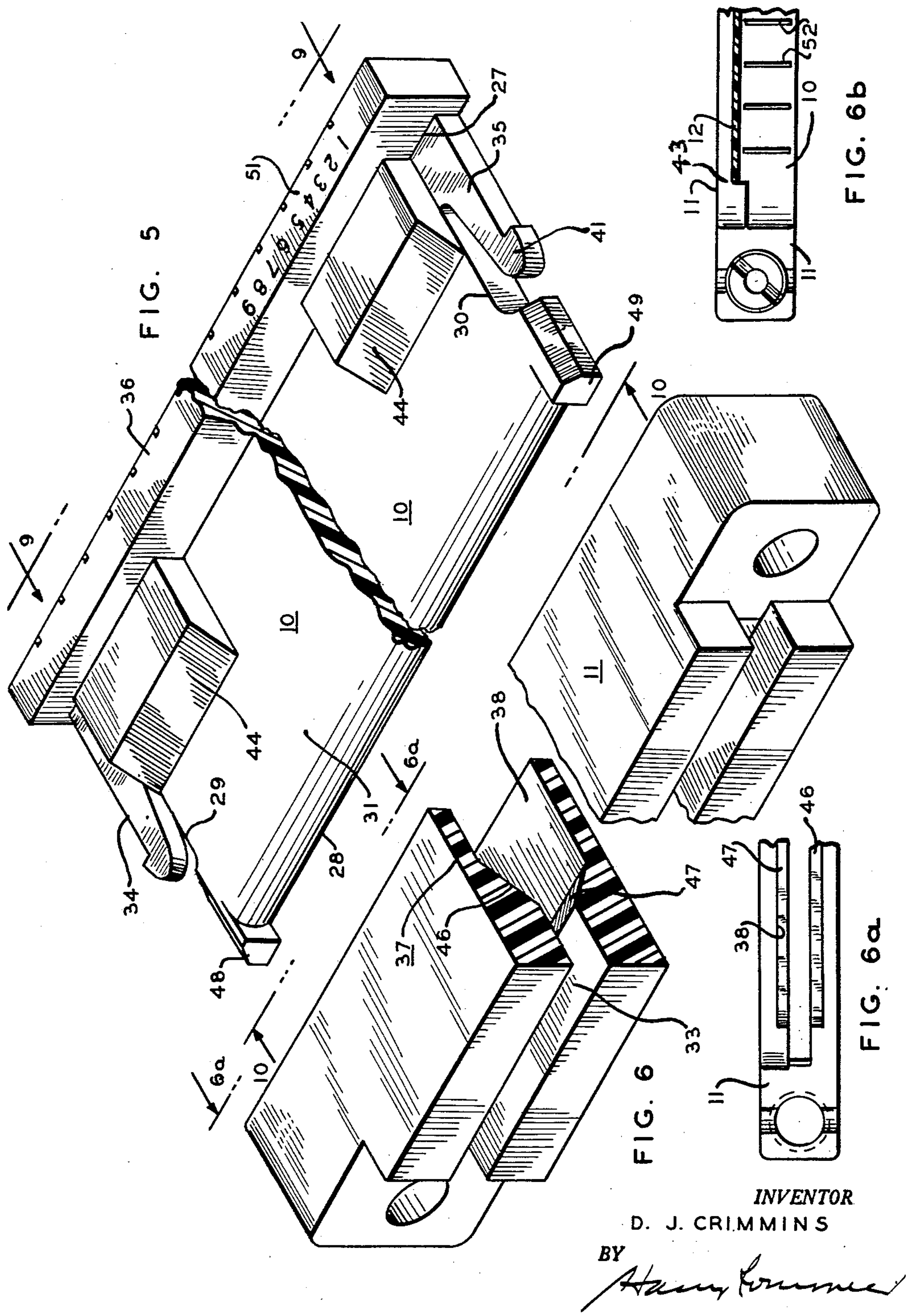
Figures 7, 8:
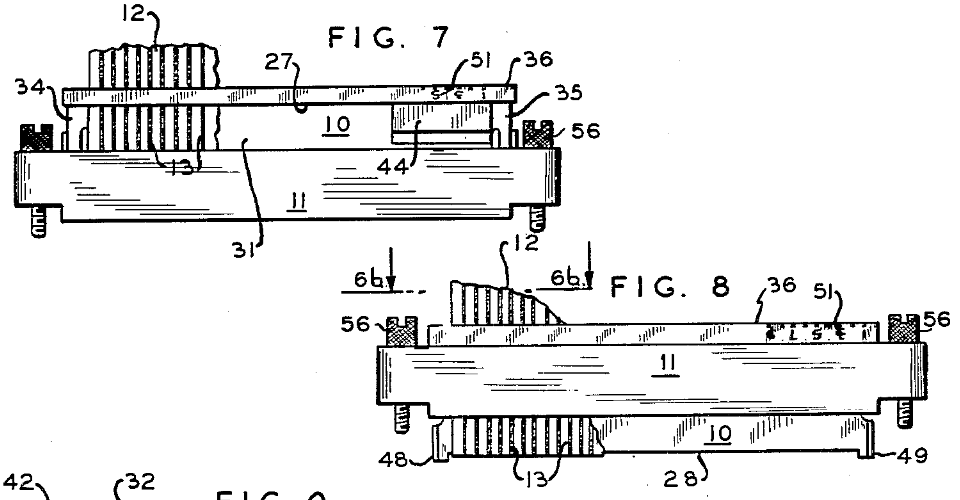
Figure 9:
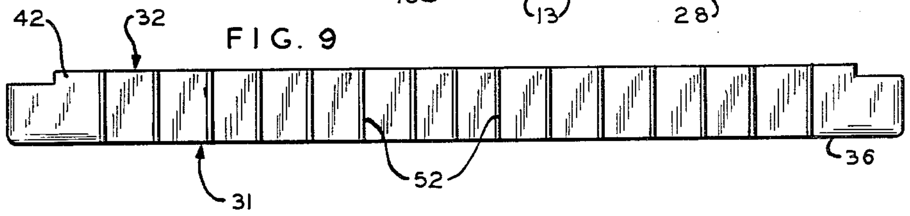
Figure 10:
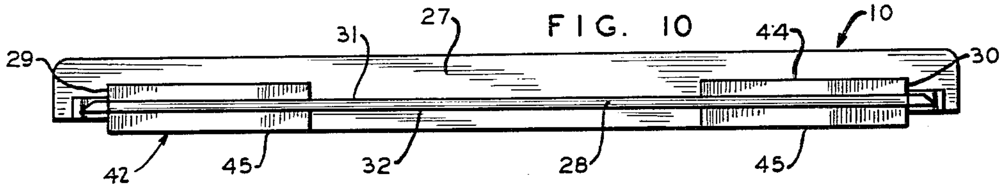
Figure 11:
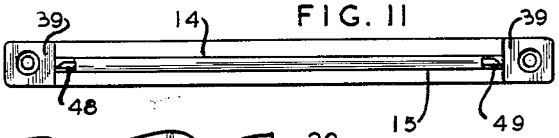
Figure 12:
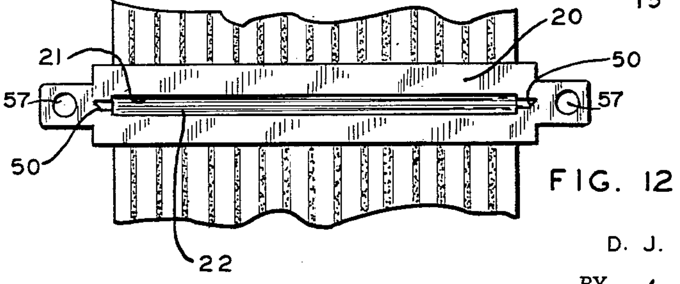

In the drawings, wherein similar reference characters indicate like parts:

FIG. 1 is a side elevational, partly fragmentary view of a conductor tape holding plate member which may be used in carrying out the invention, FIG. 2 is a fragmentary, partly sectional elevational view of a retainer bar for complementary interlatching engagement therewith, FIG. 3 is a medial vertical sectional view of the plate assembled in the holder bar and the assembly about to be inserted into a tape-engaging member, FIG. 4 is an enlarged, fragmentary elevational, partly sectional view of the right end of the assemblies of the plate and bar of FIGS. 1 and 2, showing the parts in assembled position, FIG. 5 is a partly fragmentary enlarged perspective view of the plate member, FIG. 6 is a similar view of the bar member, FIG. 6*a* is a fragmentary, top plan view of the bar member, taken at line 6*a*—6*a* of FIG. 6, FIG. 6*b* is a fragmentary plan view of the assembly taken at lines 6*b*—6*b* of FIGS. 8 and 3, FIG. 7 is a side elevational view of the plate, and fragmentarily showing the tape positioned on the plate, and thus partly inserted in the bar, FIG. 8 shows the plate fully inserted in the bar and further shows fragmentarily, the tape positioned around the plate and thus fully inserted with it through the bar and extending therefrom for contact with a tape engaging member, FIG. 9 is a top plan view of the plate, taken at line 9—9 of FIGS. 1 and 5, FIG. 10 is a bottom plan view thereof, taken at lines 10—10 of FIGS. 1 and 5, FIG. 11 is a bottom plan view of the assembly of the plate, tape and bar, taken at line 11—11 of FIG. 3, and FIG. 12 is a top plan view of a typical tape-engaging member taken at line 12—12 of FIG. 3.

The connector for conductor tape of this invention comprises (FIGS. 1 and 5) an elongated plate 10 and an elongated retainer bar 11, the plate having means (below more particularly described) for registration of the conductor tape 12 thereon in predetermined position, so that, when the plate is assembled (with said tape thereon) in the retainer bar 11 (FIGS. 3, 8, 6*b*) the conductors 13 enclosed within the strip or tape 12 (well known to those skilled in this art) will be disposed at the lower end of the assembly (FIG. 3) as planar flat conductor plate faces 14, 15 for registry with any desired tape-engaging means or fixture such as 24 (FIG. 3). The latter may comprise conductors or equipment of any type. By way of example, and not in any manner restrictive of the application of this invention, which, as will be apparent from the description herein, may be applied to any tape-engaging means, the latter may compise (FIG. 3) a housing or fixture 24 having a slot 21 therein to receive the projecting tape-faces 14, 15 and having a conductor 22 therein (which may be a wire or tape or other member held in position by suitable means such as by the spring 23). Tape-engaging member 20 containing slot 21 may be part of a fixture or apparatus 24; the invention, as above noted, is not limited thereto and further reference thereto will not be made herein.

In carrying out the invention, the user will predetermine which of the insulation covered conductors 13 in the strip 12 are to be connected to the engaging member or members 20 and these may be bared of insulation (it being necessary to bare only the portions, for example, of the faces 14, 15 extending through the assembly of the plate and bar (FIG. 3) to expose the particular conductors 13 to be connected).

The plate 10 and bar 11 may, if desired, be formed of plastic or other yieldable material. The plate 10 has top and bottom edges 27, 28 (FIGS. 1 and 5) longitudinal ends 29, 30 and front and rear faces 31, 32 (FIGS. 7 and 9). The elongated retainer bar 11 is provided with a longitudinal aperture 33 therein (FIG. 6) to receive the plate 10. Thus the conductor strip or tape may be positioned on the front face 31 of the plate and around the bottom edge 28 thereof and against and beyond the rear face 32 of the plate (FIG. 3) and this assembly inserted into the retainer bar with the plate extending therethrough to thus expose the conductor tape-faces 14, 15. Complementary means are provided on the retainer bar for latching engagement of the plate (FIG. 4) therewith when the plate is so positioned in the bar, the bar being so proportioned that the lower edge of the plate and the tape so positioned therein would then project through the bar. An offset marginal flange 36 extends from the upper edge of the plate and overlies the face 31 thereof (FIG. 5) the free end of the tape 12 as above noted, being inserted thereagainst (FIG. 3) on the assembly of the parts. Fingers 34, 35 are flexibly secured to and extend from the ends of plate (FIGS. 5, 1, 4). The holder retainer bar has parallel front and rear walls 37, 38 (FIG. 6), one of said walls (38, FIGS. 3 and 6) being of greater height than the other and complementary means are provided on the retainer bar for latching engagement of the plate fingers therewith.

The plate may be inserted through the retainer bar only if the flange 36 is disposed toward the wall 37 of lesser height. If an attempt is made to insert the plate and tape with the flange disposed in the opposite direction, the flange will abut the upper edge of the wall 38 of greater height and preclude insertion of the plate through the bar. Thus proper registration of the faces of the conductor tape in the plate and retainer bar is automatically assured on assembly of the parts. Complementary means are provided on the retainer bar for latching engagement with the plate fingers therewith on so positioning the plate in the bar, as for example, by providing the retainer bar with shouldered portions 39 (FIGS. 2 and 4) past which the fingers 34, 35 snap on assembly to interlock the parts (FIGS. 4 and 8). To disassemble the parts it is merely necessary to direct a tool 40 (FIG. 4) against the shouldered free end 41 of the finger to move the latter clear of the retainer bar shoulder 39, whereupon the plate and tape may be withdrawn from the retainer bar.

To further assure complete accuracy of registration of the parts, the plate may be provided with shouldered edge 42—equivalent to the conductor tape's width (FIGS. 9 and 10) overlying the rear face 32 of the plate which, on correct assembly of the parts, is received (FIG. 6*b*) in a recessed portion 43 of the wall 38 of the retainer bar. Bosses 44, 45 (FIG. 3) may extend from the faces of the plate adjacent the upper edge thereof for registration with complementary recessed portions 46, 47 (FIG. 6) formed in the retainer bar and extending into the aperture 33 thereof when the plate is correctly positioned in said bar (FIG. 3).

Keying posts 48, 49 (FIG. 5) depend from the plate and extend beneath the lower end thereof for keying the plate to a tape-engaging member to thus assure proper registration of the tape assembly therewith. This is exemplified in FIG. 12, showing the keying recesses 50 in the tape-engaging member 20 conformed to the cross sections of the posts 48, 49 of the plate (FIG. 10). Thus the plate may be inserted in said member 20 in only a predetermined plane and cannot be inserted incorrectly. Screw members 56 may be provided as shown in FIG. 8 cooperating with threaded holes 57 in the member 20 to secure the plate thereto.

The flange 36 may be provided with indicia markings thereon 51 (FIGS. 1 and 5) for registration with conductors in the tape when the latter is positioned thereon, thus enabling the user to immediately identify particular conductors. Of further assistance in that connection, the indicia means may include the indicia ribs or markings 52 at the top of the flange 36 and which may be continued at the face thereof (FIG. 9) for exact or alternate registration with markings 51.

Having thus described my invention, what I claim as new and desire to secure by Letters Patent is:

1. A holder for conductor tape having conductors disposed in a flexible sheath, said holder comprising an elongated flat plate having upper and lower edges and longitudinal ends, fingers movably secured to and extending from said ends of said plate, said plate being further provided with front and rear faces so that said tape may be positioned thereon, an offset marginal flange extending from the upper edge of said plate and overlying one of the faces thereof, an elongated retainer bar having parallel front and rear walls and provided with a longitudinal aperture therein to receive said plate and the tape so positioned thereon, one of said walls being of greater height than the other, and complementary means on the retainer bar for latching engagement of the plate fingers therewith when the plate is so positioned in the bar, said bar being so proportioned that the lower end of said plate and the tape so positioned thereon will project through the bar and the marginal flange face of the plate will register with the wall of said holder of lesser height when the plate is positioned in said bar aperture.

2. In a holder for conductor tape as set forth in claim 1, registering means on one of the faces of said plate and complementary registering means on the wall of greater height of the holder bar.

3. In a holder for conductor tape as set forth in claim 2, said complementary registering means on one of the faces of said plate and on the wall of greater height of the retainer bar comprising a shouldered portion on one of said members and a recessed portion to receive the same on the other of said members.

4. In a holder for conductor tape as set forth in claim 1, bosses extending from said faces of said plate below the upper edge thereof, and complementarily recessed portions formed in said holder and extending into the aperture thereof for complementary registry therewith and with the conductor tape when the plate is so positioned in said bar.

5. In a holder for conductor tape as set forth in claim 1, shouldered end portions on said fingers for latching engagement with the retainer bar when said plate is so positioned therein.

6. In a holder for conductor tape as set forth in claim 1, keying posts depending from the plate and extended beneath the lower end thereof for keying the plate to a tape-engaging member.

7. In a holder for conductor tape as set forth in claim 6, a tape-engaging member and means on said tape-engaging member for complementary keying engagement with said keying posts on the plate.

References Cited in the file of this patent

UNITED STATES PATENTS

| | | |
|---|---|---|
| 2,114,010 | Alexander | Apr. 12, 1938 |
| 3,054,979 | Buiting | Sept. 18, 1962 |

FOREIGN PATENTS

| | | |
|---|---|---|
| 700,490 | Great Britain | Dec. 2, 1953 |